United States Patent [19]

Mead et al.

[11] 4,210,708
[45] Jul. 1, 1980

[54] LITHIUM-IODINE CELL

[75] Inventors: Ralph T. Mead, Kenmore; Norbert W. Frenz, Jr., North Tonawanda; Frank W. Rudolph, Depew; Wilson Greatbatch, Clarence, all of N.Y.

[73] Assignee: Wilson Greatbatch Ltd., Clarence, N.Y.

[21] Appl. No.: 891,636

[22] Filed: Mar. 30, 1978

[51] Int. Cl.² .............................................. H01M 2/06
[52] U.S. Cl. .................................... 429/181; 429/218; 429/211
[58] Field of Search ............... 429/178, 181, 184, 211, 429/218, 234, 194

[56] References Cited

U.S. PATENT DOCUMENTS

| | | | |
|---|---|---|---|
| 3,874,929 | 4/1975 | Greatbatch | 429/211 |
| 3,981,744 | 9/1976 | Greatbatch | 429/178 |
| 4,049,890 | 9/1977 | Schneider | 429/181 |
| 4,071,662 | 1/1978 | Mead et al. | 429/218 |

*Primary Examiner*—Donald L. Walton
*Attorney, Agent, or Firm*—Christel, Bean & Linihan

[57] ABSTRACT

A lithium-iodine cell comprising a casing of electrically conducting material, an anode including a lithium element within the casing, an electrical conductor operatively connected to the lithium element and extending out from the casing, and a cathode comprising iodine-containing material in operative contact with both the casing and the lithium element. The anode electrical conductor is completely sealed from the rest of the cell, and the casing serves as the cathode current collector. The lithium anode element is shaped in a manner increasing the area of the operative surface thereof and enhancing the bond to the anode conductor, and the anode operative surface is provided with a coating of an organic electron donor material. The anode conductor is enclosed within the combination of an insulator element within the casing, an isolator element between the insulator and the conductor, and a ferrule having one end associated with the insulator within the casing and the other end extending from the casing. After assembly, the cathode material is introduced in heated form by means of a filling element through an opening in the lid of the casing which subsequently is closed.

33 Claims, 8 Drawing Figures

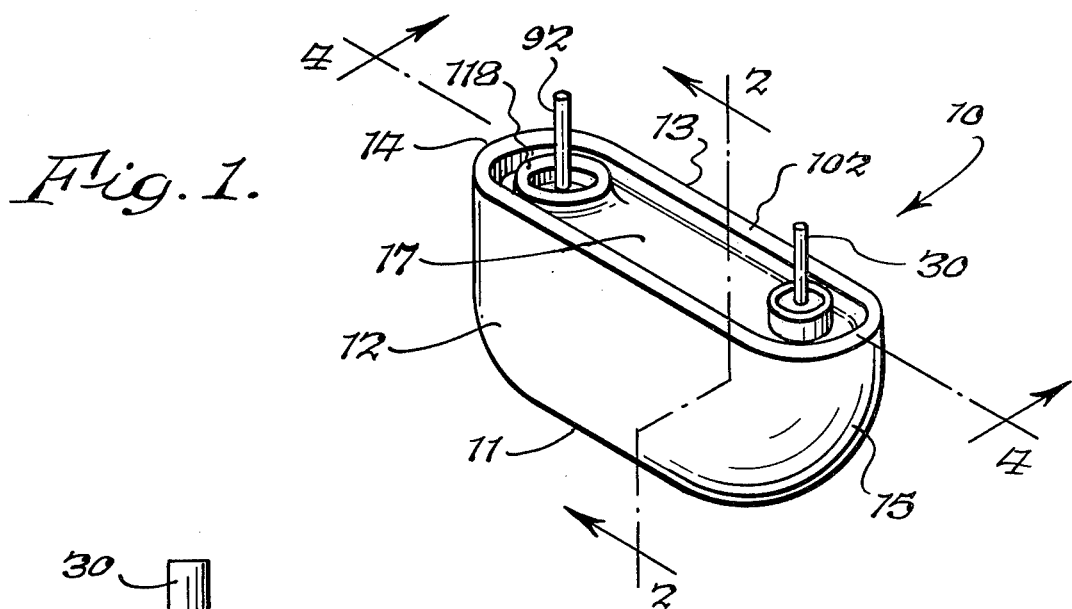
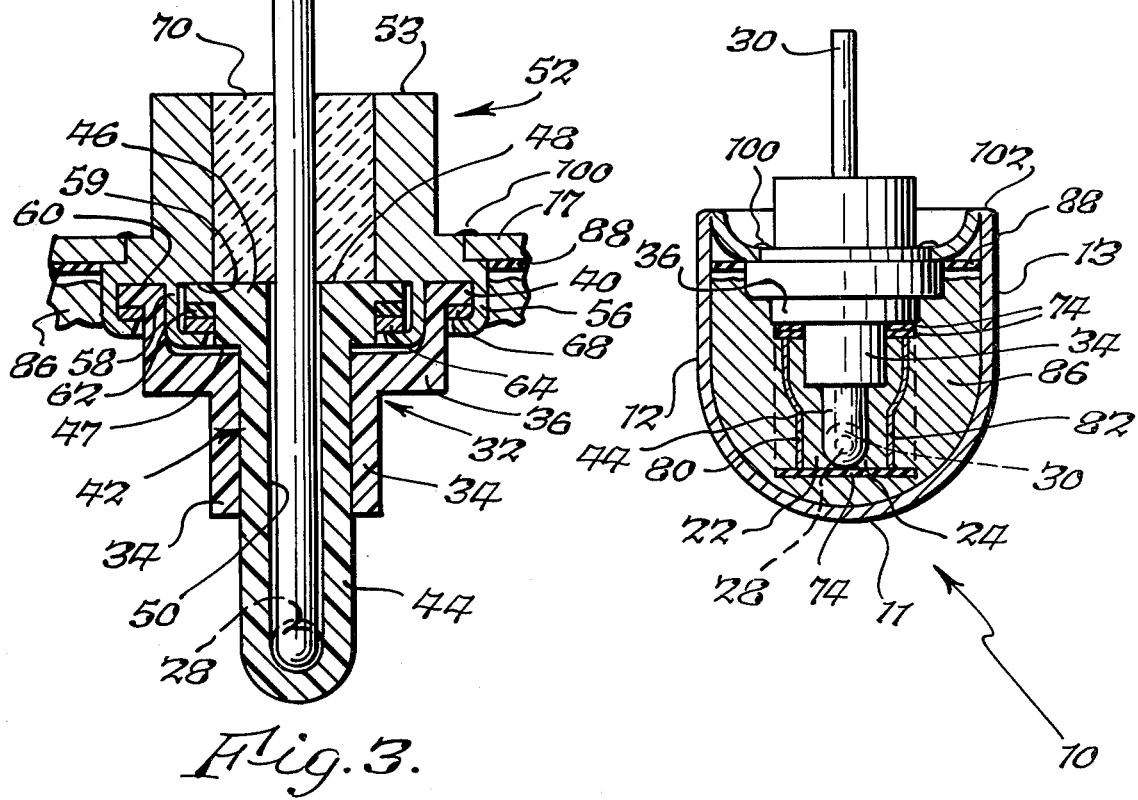

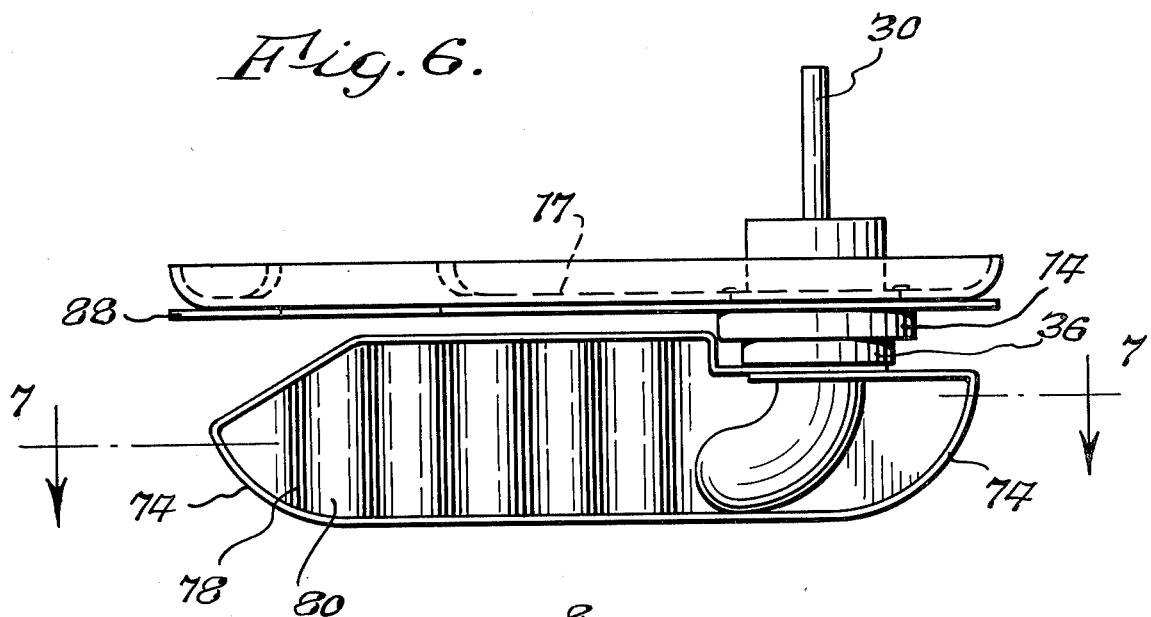
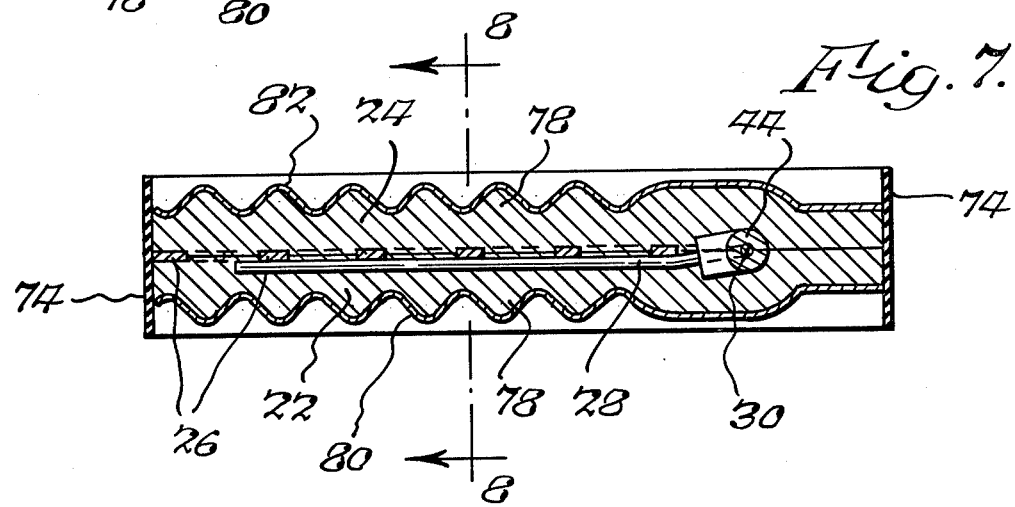
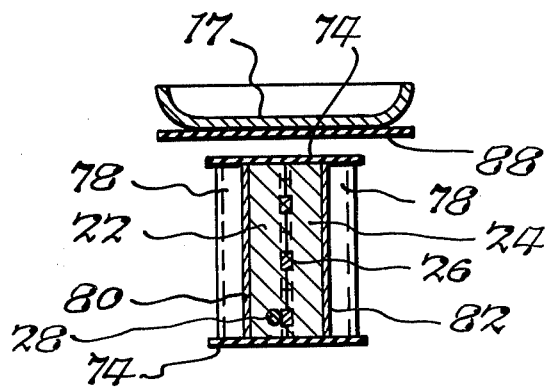

LITHIUM-IODINE CELL

BACKGROUND OF THE INVENTION

This invention relates to the conversion of chemical energy to electrical energy, and more particularly to a new and improved construction for lithium-iodine cells.

One area of use of the present invention is in providing electrical power to inaccessible devices in the human environment, for example to an implanted cardiac pacemaker, although the principles of the present invention can be variously applied. Lithium-iodine batteries are available for such use which advantageously have an open circuit voltage about twice that of the mercury cell, do not generate gas during operation, and have a non-corrosive electrolyte. The nature of the iodine-containing material such as an iodine complex is that it can tend to flow within the cell and possibly form a short circuit path between the anode collector lead and cathode. It is important to prevent such leakage, not only to maintain cell operation but also to prevent harm to a human body in which the cell may be implanted. It also is desirable to provide a cell having relatively high energy density.

SUMMARY OF THE INVENTION

It is, therefore, an object of this invention to provide a new and improved construction for a lithium-iodine cell.

It is a further object of this invention to provide such a cell having a relatively high energy density.

It is a further object of this invention to provide such a cell wherein the anode current collector is completely sealed or shielded from the iodine-containing cathode material and from the cell outer casing.

It is a further object of this invention to provide such a cell wherein the lithium area therein is relatively large and the overall cell size is relatively small.

It is a further object of this invention to provide such a cell which has relatively few parts and requires a relatively short time to assemble.

It is a further object of this invention to provide a new and improved anode for a lithium-iodine cell.

It is a further object of this invention to provide a new and improved method of making a lithium-iodine cell.

The present invention provides a lithium-iodine cell comprising a casing of electrically conducting material, anode means including a lithium element within the casing, electrical conductor means operatively connected to the lithium element and extending out from the casing, and cathode means comprising iodine-containing material within the casing and contacting the lithium element. The casing serves as a cathode current collector. The lithium anode surface is shaped or formed in a manner increasing the area of the operative surface thereof and enhancing the bond to the anode conductor, and the operative surface of the lithium anode element is provided with a coating of a organic electron donor material. The anode conductor means is completely sealed from the rest of the cell by means including an insulator element of material which is nonreactive with iodine surrounding the conductor within the casing, an isolator element of material which is non-reactive with iodine between the insulator element and the conductor, and a ferrule element enclosing the conductor having a portion within the casing and a portion extending from the casing. The cathode material comprising a charge transfer complex of an organic electron donor material and iodine. After assembly the material is introduced in heated form to the casing by means of a filling element through an opening in the lid of the casing which opening then is closed after filling with cathode material.

The foregoing and additional advantages and characterizing features of the present invention will become clearly apparent upon a reading of the ensuring detailed description together with the included drawing wherein:

BRIEF DESCRIPTION OF THE DRAWING FIGURES

FIG. 1 is a perspective view of a lithium-iodine cell according to the present invention;

FIG. 2 is a sectional view taken about on line 2—2 in FIG. 1;

FIG. 3 is a fragmentary sectional view of a portion of the cell of FIG. 1;

FIG. 6 is a side elevational view of the cell anode assembly;

FIG. 7 is a sectional view taken about on line 7—7 of FIG. 6; and

FIG. 8 is a sectional view taken about on line 8—8 of FIG. 7.

DETAILED DESCRIPTION OF THE ILLUSTRATED EMBODIMENTS

Figure 4:
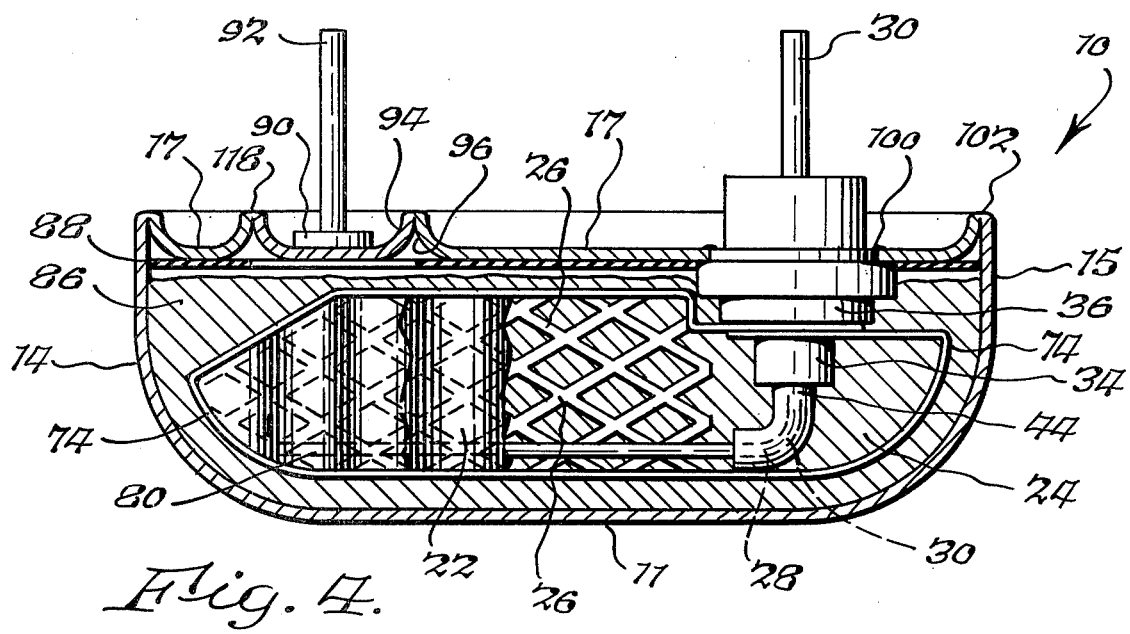
FIG. 4 is a sectional view taken about on line 4—4 in FIG. 1.

Referring not to FIG. 1, a lithium-iodine cell according to the present invention comprises a casing 10 of metal such as stainless steel which preferably is shaped or otherwise formed to be hollow and generally rectangular in shape of an integral construction including a bottom portion 11, spaced-apart planar side wall portions 12, 13 extending from the bottom portion, and spaced-apart curved end wall portions 14, 15 also extending from bottom portion 11 and joining corresponding ones of the side wall portions 12, 13. The bottom portion 11 is of compound shape in that it is curved in a direction between the side wall portions 12, 13 and has a straight portion between the end wall portions 14, 15. The curvature of bottom portion 11 between side portions 12, 13 is of the same degree as the curvature of the end wall portions 14, 15 thereby defining a continuous, curved surface around along the casing. The side wall portions 12, 13 are generally parallel. Casing 10 has an opened top or end opposite the bottom portion 11 which is sealed closed by means of a lid 17 also of metal such as stainless steel after the cell has been assembled as will be described in detail presently.

Referring now to FIGS. 2–4, the cell of the present invention further includes anode means comprising a pair of lithium elements or plates 22, 24 having an anode current collector element 26 sandwiched or positioned therebetween. As shown in detail in FIG. 4, current collector 26 is relatively thin, preferably a sheet of no. 12 mesh nickel. A conductor of nickel or suitable metal has a first portion 28 spot welded to collector element 26 along one edge thereof and has a second or lead portion 30 which extends from portion 28 at about a right angle and is of sufficient length allowing it to extend out from casing 10 for making electrical connection thereto.

Conductor portion 30 is sealed from the remainder of the cell by means including an insulator element generally designated 32 which surrounds lead 30 and which has a first portion 34 which is sandwiched between the plates 22, 24 and a second body portion 36 which is of larger cross section, preferably cylindrical, and located between the lithium plates and lid 17 when the cell is completed. The longitudinal axis of insulator 32 is generally coincident with the longitudinal axis of lead 30. The interior of portion 36 includes a first annular surface generally perpendicular to the longitudinal axis of lead 30 and a second annular surface concentric with the longitudinal axis of lead 30, the first and second surfaces meeting at a rounded or curved annular junction. Insulator 32 terminates at the one end in an annular flange portion 40 which extends radially outwardly from the end of portion 36 and which is disposed in a plane perpendicular to the longitudinal axis of lead 30. The insulator 32 is of a material which in addition to being a non-conductor of electricity also is non-reactive with iodine, i.e. does not exhibit electronic conduction when exposed to iodine. One form of material found to perform satisfactorily is a fluoropolymer material commercially available under the name Halar, a trademark of the Allied Chemical Company. Of course, other materials having these characteristics can be used for the insulator 32.

The anode conductor sealing means further comprises an isolator element generally designated 42 located between insulator 32 and conductor 30. In particular, isolator 42 includes a first portion 44 having an outer dimension enabling it to fit relatively snugly within insulator portion 34 and a second portion 46, preferably generally cylindrical in shape, having an outer diameter less than the inner diameter of insulator portion 36 and an axial length smaller than the axial length of insulator portion 36. One axial end face 47 of isolator portion 46 abuts against the first inner annular surface of insulator portion 36, and this end face is of a diameter smaller than that of the opposite axial end face 48. The two axial end faces of isolator portion 46 are disposed in parallel planes and define two diametric sections of isolator portion 46 which meet at an intermediate annular surface disposed in a plane parallel to the end faces 47, 48. This, in turn, defines an annular recess or shoulder adjacent the axial end face 47 and adjacent the inner surface of insulator portion 36 against which the isolator portion 46 abuts. Isolator 42 has a longitudinal passage or bore 50 along the entire length of isolator 42 and of a cross-sectional dimension enabling it to receive anode conductor 30. The isolator element 42 is of a material which does not exhibit electronic conduction when exposed to iodine. One form of material found to perform satisfactorily is a fluoropolymer material commercially available under the name Tefzel, a Trademark of the Dupont Company.

The anode conductor sealing means further comprises a ferrule 52 of metal such as stainless steel which encloses a further portion of lead 30. Ferrule 52 is of generally hollow cylindrical shape with substantially constant outer diameter proceeding from one end 53 toward casing 10 as viewed in FIG. 3, and ferrule 52 has a slightly larger outer diameter which increases stepwise in the region adjacent lid 17 thereby providing a slightly greater wall thickness along the portion adjacent lid 17. The longitudinal axis of ferrule 52 is generally coincident with the longitudinal axis of lead 30. The inner diameter of ferrule 52 is substantially constant proceeding from the one end and continuing along within the larger diameter portion. At the opposite end of ferrule 52 there is formed an outer or circumferential annual rim or flange 56 which is relatively thin as compared to the wall thickness of ferrule 52. Rim 56 is generally concentric with the longitudinal axis of ferrule 52. Ferrule 52 also is formed with an inner rim or flange 58 radially inwardly of rim 56 and generally concentric therewith. Rim 58 is of substantially the same wall thickness and length as rim 56, and is located radially outwardly of the longitudinal central bore or passage of ferrule 52. Prior to assembly of the parts illustrated in FIG. 3, rims 56 and 58 are disposed entirely concentric with respect to the longitudinal axis of ferrule 52. Ferrule 52 has an annular end face 59 radially within rim 56 and another annular end face 60 between rims 56 and 58, the end faces 59 and 60 being coplanar. Anode lead 30 extends through ferrule 52 along the longitudinal axis thereof and spaced substantially equidistant from the inner surface of ferrule 52.

As shown in FIG. 3, portion 46 of isolator element 42 is received within the inner annular rim 58 of ferrule 52, and isolator end face 48 abuts the annular end face 59 of ferrule 52. The outer diameter of isolator portion 46 adjacent end face 48 is less than the inner diameter of the ferrule rim 58 thereby defining an annular clearance space. The combination of a sealing ring 62 and protective ring 64 is carried in the outer annular recess of isolator portion 46. In particular, ring 62 is positioned against the intermediate annular surface of isolator portion 46. Ring 62 is of rubber, Silastic or similar sealing material, has an inner diameter substantially equal to the diameter of the smaller section of isolator portion 46, and has an initial outer diameter substantially equal to the diameter of the larger section of isolator portion 46. Protective ring 64 is a metal washer, preferably of stainless steel, and is positioned against the exposed face of sealing gasket 62. Washer 64 preferably is of the same size as gasket 62. The combined axial length of gasket 62 and washer 64 is such as to leave an axial space between the exposed face of washer 64 and the plane of end face 47 which space has a thickness substantially equal to the wall thickness of the ferrule rim 58, the outer end portion of which is crimped or bent radially inwardly into contact with washer 64 in a manner which will be described in detail presently.

The annular flange 40 of insulator 32 and the annular section of insulator portion 36 adjacent the flange are received within the annular region between the ferrule rims 56 and 58. In particular, the end face of flange 40 which is disposed in a plane perpendicular to the longitudinal axis of insulator 32 abuts the annular end face 60 of the ferrule between rims 56 and 58. The annular flange 40 is of such radial dimension that it fits snugly between rims 56, 58. A protective ring 68 is carried or fitted on insulator portion 36 adjacent flange 40. In particular, ring 68 has an outer diameter substantially equal to the outer diameter of flange 40, an inner diameter substantially equal to the outer diameter of insulator portion 36, and a thickness substantially equal to the thickness of ring or washer 64. Ring 68 also is of metal, preferably stainless steel, and is positioned against flange 40. The outer end portion of ferrule rim 56 is crimped or bent radially inwardly into contact with washer 68 in a manner which will be described in detail presently.

A cylindrical seal element 70 of glass having an axial bore to receive conductor 30 is fitted within ferule 52. Seal 70 contacts axial end face 48 of isolator portion 46 and extends along within ferrule 52 between the opposite axial end faces 53 and 59.

The anode assembly comprising the lithium elements 22, 24 and current collector 26 is fitted within an anode holding means or frame in the form of strap 74 which embraces the anode assembly in a manner exposing at least one lithium surface. Strap 74 is of the aforementioned Halar material or any similar material which is nonreactive with iodine. In the present illustration, strap 74 surrounds the peripheral edges of the lithium elements or plates 22, 24 in a snug, sealing relationship. The opposite ends of strap 74 are provided with apertures of a size sufficient to receive the insulator portion 34, and these ends are overlapped adjacent the juncture of insulator portions 34 and 36 as shown in FIG. 4. Strap 74 follows the contour or outline of the lithium elements 22, 24 which includes a relatively straight bottom portion facing casing bottom 11, upwardly curved portions at each end of the bottom portion, a right angle step portion against which insulator portion 36 rests, a flat top portion facing lid 17 and generally parallel thereto, and an inclined or angled portion joining the top and bottom portions.

One illustrative method of forming the anode assembly is as follows. First there is provided a subassembly including conductor portion 30 within the combination of insulator 32, isolator 42 and ferrule 52. In particular, gasket 62 and washer 64 are fitted in place on portion 46 of isolator 42, and these parts are assembled to ferrule 52 with isolator portion 46 and the gasket 62 and washer 64 received within rim 58 and isolator end face 48 contacting the ferrule end face 59. The extending portion of rim 58 is crimped, bent or otherwise formed radially inwardly into firm contact against washer 64 as shown in FIG. 3. The force of rim 58 against washer 64 will cause gasket 62 to expand radially outwardly into the clearance space. Washer 64 protects isolator portion 46 and gasket 62 during the crimping of rim 58. Then the combination of isolator 42 and ferrule 52 is joined to insulator 32. In particular, insulator portion 36 and the annular flange 40 are fitted into the portion of ferrule 52 between rims 56 and 58, and isolator portion 44 is received in and along insulator portion 34. The outer end face of flange 40 abuts ferrule end face 60, and then the extending portion of rim 56 is bent, crimped or otherwise formed radially inwardly into firm contact with washer 68 as shown in FIG. 3. The parts can be joined further by means of a suitable cement which is nonreactive with iodine such as a cyanoacrylate cement commercially available under the name Permabond 101.

Strap 74 is assembled into place with the ends overlapped to align the openings therein which then are fitted onto insulator portion 34 as shown in FIG. 4. The overlapping ends joined to insulator portion 34 can be sealed in place with the aforementioned Permabond 101 cyanoacrylate cement. The isolator portion 44 and junction of conductor portions 28, 30 located within strap 74 are bent or otherwise curved as a unit by a suitable tool to the left as viewed in FIG. 4 to provide adequate spacing from the adjacent section of strap 74. Current collector 26 and the conductor portion 28 are spot welded together whereupon the lithium plates 22, 24 are positioned within strap 74 on opposite sides of the collector element 26 and insulator portion 34. As shown in FIG. 4, the step or rectangular shoulder on the peripheral edge of the lithium plate combination abuts against the lower surface and one side portion of insulator portion 36, strap 74 being therebetween. Strap 74 follows the contour of the lithium plate combination as shown in FIG. 4. The subassembly then is placed within two mold sections and is pressed together with a suitable force, for example about 3,000 lbs. The current collector 26, conductor portion 28, insulator portion 34 and the section of lead portion 30 contained therein are sealed within the lithium elements 22, 24. The inner surfaces of the two mold sections are shaped to define the rippled or corrugated outer anode surfaces as shown in FIGS. 4 and 6–8. In particular, the oppositely directed lithium anode surfaces are formed each to have spaced, generally mutually parallel ribs or corrugations 78 which extend parallel to the common longitudinal axes of ferrule 52 and the section of lead 30 therein. The formations or ribs have generally smooth, outer surfaces and preferably are generally semi-circular in cross-section. The ribs 78 perferably extend along the entire anode surface between opposite portions of strap 74. In the anode structure shown, the sections between adjacent ribs 78 have oppositely directed smooth surfaces and the common thickness of the sections is about one-half the width of strap 74. The ribs 78 occupy a major portion of the surface area of each lithium element, 22, 24. The remaining surface portions are generally planar and mutually generally parallel except around insulator portion 34 and isolator portion 44 where they are curved or outwardly bulged. This formation to enclose the insulator and isolator portions also is defined by the mold sections. The material of strap 74 is pressure bondable to lithium with the result that the peripheral juncture at the edges of the lithium elements 22, 24 is enclosed or sealed by the strap 74. The finished anode assembly thus has two exposed surfaces which are oppositely directed or disposed.

After the anode assembly is completed, the exposed surfaces of lithium elements 22 and 24 are provided with coatings 80 and 82, respectively, of an organic electron donor component material and the nature of the coatings 80, 82 and their role in the cell of the present invention will be described in further detail presently. The completed anode assembly is positioned in casing 10 as shown in FIGS. 2 and 4, with the anode operative surfaces spaced from the inner surface of casing 10.

The cell of the present invention further comprises an iodine cathode including a region of cathode material 86 within casing 10 and operatively contacting the exposed surfaces of the lithium elements 22, 24 and operatively contacting the inner surface of casing 10. Casing 10, being of electrically conducting material, serves as a cathode current collector. According to a preferred mode of the present invention, the cathode material 86 comprises a charge transfer complex of an organic electron donor component material and iodine. The electron donor can be any organic compound having a double bond or an amine group. The electron donor functions to give the iodine sufficient conductivity for proper cell operation. A preferred form of the organic electron donor component is polyvinyl pyridine polymer and, in particular, two-vinyl-pyridine polymer.

The cell of the present invention can further include an element 88 of mica or other suitable material positioned in casing 10 above cathode material 86. Element 88 is planar and relatively thin and is located in contact with the lower or inner surface of lid 17 and above cathode material 86 and disposed generally perpendicular to casing sidewalls 12, 13. Element 88 is of a peripheral outline or shape and size so as to fit snugly within casing 10 and can be cemented in place if desired. Element 88 serves as a heat shield to protect the remainder of the components within casing 10 from heat during welding of lid 17 into place. A terminal element comprising a base 90 and shaft or pin portion 92 is spot welded to a closure element 94 which, in turn, is welded in place in an opening 96 in lid 17 in a manner which will be described. The terminal element 92 preferably is of nickel and serves as an electrical terminal inasmuch as the casing 10 serves as a cathode current collector.

The cell of the present invention can be fabricated in the following manner. An assembly of insulator 32, isolator 42, ferrule 52 and the associated components is formed in the manner described herein. This assembly and the anode assembly is combined by means of the pressure forming method previously described. The combined assembly is joined to lid 17 and heat shield 88, with ferrule 52 being received in openings in the lid and shield. In particular, the outer annular step or shoulder on ferrule 52 near rim 56 is fitted in the opening of lid 17, and ferrule 52 and lid 17 are welded together at 100. Shield 88 is in contact with the inner surface of lid 17. The resulting combination then is placed in casing 10 with lead 30 disposed generally parallel to casing walls 12, 13 and with the outer ends of ferrule 52 and lead 30 located outwardly of the open end of casing 10. Lid 17 is welded to the periphery of casing 10 at 102. Casing 10 and the combination of parts therein is held upright with the open end facing upwardly by a holding fixture or other suitable means. Then cathode material is introduced to the casing 10 through the opening 96 in lid 17. In particular, the cathode material or depolarizer is prepared by heating the organic material, i.e. 2-vinyl pyridine polymer, mixed with iodine, to a temperature greater than the crystallization temperature of iodine, for example about 300° F. The amount of iodine should be greater than about 50 percent by weight of the resulting mixture so that enough iodine is available in the cathode material to provide sufficient conductivity for proper cell operation. The resulting mixture is a viscous, flowable substance which can be introduced to cell casing 10 in the following manner.

Figure 5:
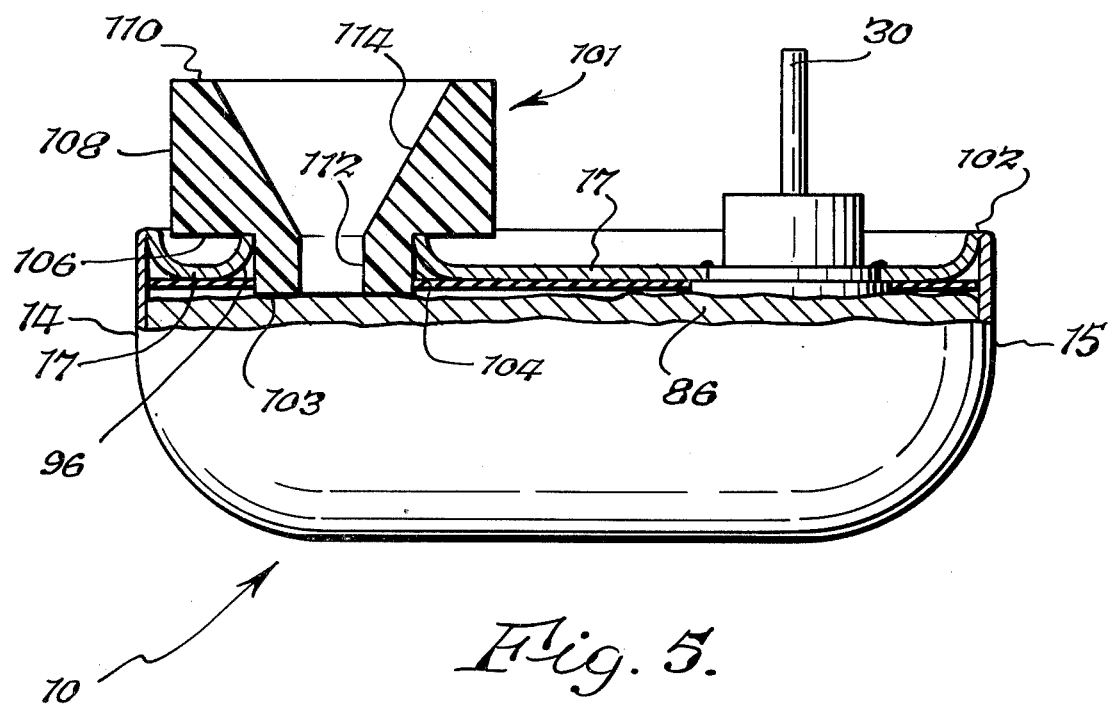
FIG. 5 is a fragmentary sectional view illustrating a cell filling technique.

As shown in FIG. 5, a filling element generally designated 101 is placed in the opening 96 of lid 17 in a manner covering the surface region of the lid in, around and adjacent the opening 96 and isolating or protecting this surface from cathode material introduced to the casing through a passage in the filling element. In particular, element 101 comprises a solid body of material which is non-reactive with iodine, for example Teflon. While Teflon is preferred because it is easy to machine, other suitable materials including metal can be employed. Element 101 is formed to include a planar end face 103 having a surface area and configuration substantially equal to the interior cross sectional shape and area of opening 96. End face 103 meets a first sidewall surface portion 104 extending continuously around the element and shaped and dimensioned to fit snugly within opening 96 and in firm sealing-like contact with the lid inner wall surface defining the opening 96. Portion 104 meets a continuous ledge portion 106 disposed parallel to end face 103 which ledge is adapted to rest on the edge outlining the opening 96 as shown in FIG. 5. If desired, ledge 106 can be dimensioned so that it also rests on the peripheral junction of lid 17 and casing 10. Ledge 106 meets another sidewall surface portion 108 of perimeter greater than that of portion 104, and surface portion 108 meets another end face 110 of element 101 which is disposed substantially parallel to end face 103.

A filling passage extends through body 101 from end face 110 through end face 103. A first bore or passage 112 extends into body 101 from end face 103 and is of relatively constant diameter. A second passage 114 of increasing diameter extends from passage 112 to end face 110. Passage 114 thus is generally funnel-shaped. Element 101 is fitted into the opening 96 of lid 17 as shown in FIG. 5 with ledge 106 resting on the upper edge of the opening and surface portion 104 firmly contacting the inner wall surface adjacent the opening. The distance between end face 103 and ledge 106 is such that when ledge 106 rests on the upper edge of opening 96, end face 103 is spaced a short distance inwardly of the inner surface of lid 17 and heat shield 88 which has an opening to receive element 101.

The heated cathode material is poured or otherwise introduced to the funnel shaped passage 114 and passage 112 through which it flows into the interior of casing 10. The amount of cathode material 86 introduced to casing 10 is sufficient to contact the exposed surfaces of the lithium elements 22, 24 and to reach a level at or closely adjacent the end face 103 of filling element 101. The inner and adjacent surfaces of opening 96 contacted by surfaces 104 and 106 are kept clean and free of contamination by cathode material. When filling is completed, element 101 is removed from lid 17 and the closure element 94, preferably also of stainless steel, is fitted in place in opening 96 and then welded to lid 17 at 118 as shown in FIG. 4. An effective weld results from the clean inner surface and edge of opening 96. The terminal element including base 90 and pin 92 can be spot-welded to closure 94 either before or after closure 94 is welded to lid 17.

The lithium-iodine cell according to the present invention operates in the following manner. As soon as the iodine-containing cathode material, for example the cathode material 86 in FIGS. 2–5, operatively contacts a lithium element, a solid lithium-iodine electrolyte begins to form at the interface. In the present illustration this occurs at the outer or oppositely disposed surfaces of the two lithium elements 22 and 24. An electrical potential difference will exist between the anode lead 30 and cathode terminal pin 92 because casing 10 is of electrically conductive material and operatively contacts the iodine-containing material to serve as a cathode current collector. The mechanism by which the foregoing is accomplished is believed to include migration of lithium ions through the electrolyte whereby lithium is the ionic species in the cell. The exact mechanism by which the iodine-containing cathode material 86 and lithium elements 22 and 24 come into operative contact through coatings 80 and 82, respectively, is not known. The mechanism could involve migration of iodine ions from material 88 through coatings 80, 82 to elements 22, 24 or migration of lithium ions from elements 22, 24 through coatings 80, 82 to material 86.

The material of coatings 80 and 82 on lithium elements 22 and 24, respectively, is an organic electron donor material of the group of organic compounds known as charge transfer complex donors. The material of the coatings can be the organic electron donor material used in preparing the charge transfer complex of the cathode material 86, but other materials can be employed. A preferred material for the coatings is polyvinyl pyridine and it is applied to the exposed surfaces of lithium elements 22 and 24 in the following manner. A solution of poly-2-vinyl pyridine polymer in anhydrous benzene or other suitable solvent is prepared. The poly-2-vinyl pyridine is readily commercially available. The solution is prepared with 2-vinyl pyridine present in the range from about 10 percent to about 20 percent by weight with a strength of about 14 percent by weight of 2-vinyl pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10 percent the resulting coating can be undesirably too thin and when the solution is prepared at a strength greater than about 20 percent the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours. The foregoing procedure can be repeated to provide multiple coatings or layers, for example three, on each lithium plate.

The coatings 80 and 82 on lithium elements 22 and 24, respectively, perform several important functions. One is a desirable reduction in cell impedance believed to result from a better and improved electrically effective contact area between the cathode material and each lithium element. In particular, when iodine-containing cathode material at an elevated temperature comes into contact with an uncoated lithium surface, there can be some immediate recrystallization of iodine on the lithium surface thereby blocking or preventing operative contact at that point between the lithium element and the complex of organic material and iodine. Coatings 80 and 82 serve as protective coatings to prevent this problem, functioning as buffers between the pure lithium plates and the relatively hot cathode material as it contacts the plates. There may be other mechanisms involved in the improvement of performance resulting from the use of this coating. As a result, there is provided a greater utilization of the surface of each anode element by the cathode material. In addition, the protective coatings 80, 82 permit a relatively longer handling time during construction of the cell prior to introducing the hot cathode material.

It is important that the iodine-containing material 86 is not allowed to come in contact directly with any portion of the electrical conducting means connected to the lithium members of the anode, in particular anode current collector 26 and leads 28, 30. Otherwise, this will cause an electronic conduction between the cathode material 86 and the anode current collector 26 or conductor sections 28, 30 creating an electrical short circuit condition in the cell. In particular, any migration of the iodine-containing complex of material 86 directly to anode current collector 26 or directly to anode conductor sections 28, 30, instead of first reacting with a lithium member of the anode, will result in the condition of electronic conduction thereby creating an electrical short circuit condition in the cell. On the other hand, when the iodine-containing material 86 contacts only the lithium portion of the anode this gives rise first to a condition of ionic conduction and results in proper cell operation.

The cell construction according to the present invention advantageously prevents an electrical short circuit resulting from migration or flow of iodine-containing material 86. In particular, anode current collector 26, conductor portion 28 and the neighboring section of conductor portion 30 are sealed within the sandwiched or pressure bonded assembly of lithium elements 22, 24. This seal is enhanced by the forming of ribs 78 in the lithium elements 22, 24 during the pressing operation. In particular, forming ribs 78 by the pressing operation enhances the lithium-lithium bond between elements 22, 24 and through the grids or mesh of collector 26 because the deformation in the lithium elements 22, 24 caused by the rib forming operation exposes new surfaces of the lithium metal to each other. This seal is further enhanced by the strap 74 which is of Halar or similar material which is non-reactive with iodine.

The foregoing arrangement together with insulator 32, isolator 42, ferrule 52, seal 62 between isolator 42 and ferrule 52, and seal 70 between ferrule 52 and conductor portion 30 provides an anode structure which is completely sealed with the exception of the exposed lithium surface portions of the anode which are available to the cathode material 86. All parts of the anode current collector 26, conductor portion 28 and conductor portion 30 extending therefrom are shielded from the cathode material, and from the cell casing. Furthermore, the sealed assembly advantageously is completed before the entire cell is assembled, in particular before cathode material 86 is added thereto. Insulator 32 of Halar or similar material which is non-reactive with iodine surrounds and protects lead portion 30 between lid 17 and the current collector 26 within lithium elements 22, 24. Ferrule 52 surrounds and protects lead portion 30 from a point within lid 17 and adjacent insulator portion 36 to a point outside casing 10. The combination of ferrule rim 56, washer 68 and insulator flange 40 provides firm mechanical connection between insulator 32 and ferrule 52, and the arrangement also increases the path length for any leakage of cathode material 86 which might happen to occur between insulator 32 and ferrule 52. Washer 68 protects insulator 32, particularly flange 40, when rim 56 is crimped or otherwise formed to join the parts together.

Isolator element 42 provides another seal around anode lead portion 30, in effect a double seal or redundant seal arrangement in co-operation with insulator 32. In particular, any iodine-containing cathode material 86 which might happen to leak past the combination of rim 56, washer 68 and flange 40 at the junction of insulator 32 and ferrule 52 is sealed from anode lead 30 by isolator portion 46 and by the entire length of isolator portion 44. The radial outward expansion of seal element 62 into the clearance space between isolator portion 46 and ferrule rim 58 provides an hermetic seal between isolator element 42 and ferrule 52. The glass element 70 provides a seal between isolator portion 46 and ferrule 52 and lead 30. The foregoing arrangement thus advantageously provides several seals between the anode conductor means and the remainder of the cell.

When the heated cathode material 86 is introduced to the interior of casing 10 by means of the filling element 101, the edge and inner wall surface of lid 17 adjacent and circumscribing the opening 96 are kept clean, i.e. free of the cathode material, which improves the quality of the weld subsequently made between those surfaces of lid 17 and the closure element 94. The filling element 101 also enables casing 10 to be filled with the heated, flowable cathode material in an even and uniform manner, with the lower end surface 103 serving to establish an upper or maximum limit or control on the level to which the casing is filled with the material 86. As shown in FIG. 5, cathode material 86 preferably is filled to a level just contacting the surface 103 of filling element 101. The angled or downwardly inclined corner portion of the anode assembly adjacent the outlet of the filling passage 112 provides adequate space to promote flow of cathode material from passage 112 into casing 10.

By having all parts of anode current collector 26 and conductor portions 28, 30 shielded or sealed from cathode material 86 and from the metal casing 10, no insulation is needed between the cathode material and the metal casing. The casing can be completely filled with cathode material which considerably increases the iodine content of the cell as compared to cells requiring insulation. Another advantage of the cell of the present invention is that by virtue of the foregoing arrangement, the metal casing becomes a very large cathode current collector thereby improving cell performance due to the relatively larger amount of cathode material in contact with the current collector. In addition, providing ribs 78 on the operative surfaces of the lithium anode elements 22, 24 increases the effective surface area of the anode elements in operative contact with cathode material 86. The foregoing provides a cell having a high energy density and this desirable characteristic is enhanced by the coatings 80, 82 of organic electron donor material. By eliminating the need for insulation between cathode material 86 and metal casing 10, the cell of the present invention can be assembled relatively quickly and economically and requires relatively fewer parts.

It is therefore apparent that the present invention accomplishes its intended objects. While a single embodiment of the present invention has been described in detail, this is for the purpose of illustration, not limitation.

We claim:
1. A lithium-iodine cell comprising:
   a. a casing of electrically conducting material;
   b. anode means positioned within said casing and comprising an element of lithium having an exposed surface portion and another surface portion;
   c. electrical conductor means operatively connected to said other surface portion and extending through said casing;
   d. means for sealing said conductor means from the remainder of said cell, said sealing means comprising an insulator element in generally concentric relationship with said conductor within said casing, said insulator element having an axial end face portion and being of a material which does not exhibit electronic conduction when exposed to iodine, an isolator element of a material which does not exhibit electronic conduction when exposed to iodine and located between said insulator element and said conductor, said isolator element having an axial end face portion substantially coplanar with said axial end face portion of said insulator element, and a ferrule element in generally concentric relationship with said conductor, said ferrule having one end within said casing and having a portion extending from said casing, said end of said ferrule within said casing having an axial end face portion abutting said axial end face portions of said insulator and said isolator, said ferrule including a first formation extending generally axially outwardly from said ferrule end face portion and generally radially inwardly engaging said isolator element for joining said ferrule to said isolator, said ferrule including a second formation located radially outwardly of said first formation extending generally axially outwardly from said ferrule end face portion and generally radially inwardly engaging said insulator for joining said ferrule to said insulator;
   e. cathode means comprising iodine-containing material within said casing and in operative contact with said exposed surface portion of said lithium element and with a major portion of the surface of said casing in a manner such that said casing serves as a cathode current collector; and
   f. said sealing means shielding said conductor means from said iodine-containing material and electrically insulating said conductor means from said casing;
   g. whereby an electrical potential difference exists between said conductor means and said casing during operation of said cell.

2. A cell according to claim 1 further including a seal element between said isolator element and said insulator.

3. A cell according to claim 1, wherein said isolator element is generally cylindrical having a substantially constant inner diameter and first and second outer diameter portions, said conductor extending through along said isolator element and said isolator second portion being of greater diameter than said first portion and wherein said insulator element has a first generally cylindrical portion having an inner diameter substantially equal to the outer diameter of said isolator first portion for receiving said isolator portion in a relatively snug fitting relation and a second generally cylindrical portion having an inner diameter greater than that of said first portion for receiving said isolator second portion.

4. A cell according to claim 3, wherein said ferrule has an end portion abutting said insulator element and further includes an annular rim extending from said end portion inside said insulator second portion and around about the periphery of said isolator second portion and having a portion extending generally radially inwardly for joining said isolator element to said ferrule.

5. A cell according to claim 4, further including a seal element between said isolator second portion and said ferrule rim.

6. A cell according to claim 1, wherein said ferrule is spaced from said conductor means and further including a seal between said ferrule and conductor means.

7. A cell according to claim 6, wherein said seal is of glass.

8. A cell according to claim 1, wherein said casing includes a lid and said ferrule extends through an opening in said lid.

9. A cell according to claim 1, wherein said casing has a lid welded thereto, said ferrule has a portion adjacent said lid and further including a heat shield element carried by said ferrule portion in said casing between said anode means and said lid.

10. A cell according to claim 1 further including a coating of an organic electron donor material on said exposed surface of said lithium anode.

11. A cell according to claim 10, wherein said organic electron donor material is polyvinyl pyridine polymer.

12. A cell according to claim 1, wherein said cathode comprises a charge transfer complex of an organic electron donor material and iodine.

13. A cell according to claim 12, wherein said organic donor material is polyvinyl pyridine polymer.

14. A cell according to claim 12, wherein said organic electron donor material of said cathode is the same as said organic electron donor material of said coating.

15. An anode assembly for a lithium-iodine cell including iodine-containing cathode material, said anode assembly comprising:
(a) at least one lithium element having an operative surface portion and another surface portion;
(b) electrical conductor means connected to said other surface portion;
(c) means for sealing the connection of said electrical conductor means to said other surface portion of said lithium element from contact with said cathode material; and
(d) said operative surface of said lithium element being shaped to include formations which increase the surface area thereof in operative contact with said cathode material.

16. An anode assembly according to claim 15, wherein said operative surface of said lithium element is rippled.

17. An anode assembly according to claim 15, wherein said operative surface of said lithium element is shaped to include ribs having generally curved outer surfaces.

18. An anode assembly according to claim 15, wherein said anode electrical conductor means comprises an anode current collector operatively contacting said other surface portion of said lithium element and an electrical lead extending from said current collector, and wherein said anode assembly further includes another lithium element, said lithium elements being bonded together and against said current collector in a manner sealing said current collector between said elements.

19. An anode assembly according to claim 18, wherein said formations are included on the operative surfaces of both of said lithium elements and wherein said formations expose new surfaces of the lithium elements to each other to enhance the bond therebetween and to said current collector.

20. An anode assembly according to claim 18, further including a seal element continuously surrounding the peripheral edges of said lithium elements in a manner sealing said edges.

21. An anode assembly according to claim 20, wherein said seal element is of a material which does not exhibit electronic conduction when exposed to iodine.

22. An anode assembly according to claim 21, wherein said seal element is of a fluoropolymer material.

23. An anode assembly according to claim 15, further including a coating of an organic electron donor material on said operative surface of said lithium element.

24. An anode assembly according to claim 23, wherein said organic electron donor material is polyvinyl pyridine polymer.

25. A lithium-iodine cell comprising:
a. a casing of electrically conducting material;
b. anode means positioned within said casing and comprising an element of lithium having an exposed surface portion and another surface portion;
c. electrical conductor means operatively connected to said other surface portion and extending through said casing;
d. means for sealing said conductor means from the remainder of said cell, said sealing means comprising an insulator element in generally concentric relationship with said conductor within said casing, said insulator element being of a material which does not exhibit electronic conduction when exposed to iodine, an isolator element of a material which does not exhibit electronic conduction when exposed to iodine and located between said insulator element and said conductor, and a ferrule element in generally concentric relationship with said conductor, said ferrule having one end within said casing and joined at said one end to said insulator and to said isolator and said ferrule having a portion extending from said casing, said ferrule having an annular end face, said insulator having an annular end face portion abutting a portion of said ferrule end face, said isolator element having an annular end face abutting a portion of said ferrule end face, said ferrule including a first annular rim extending from said annular end face located radially outwardly of said insulator, said rim having an end portion disposed generally radially inwardly for joining said insulator to said ferrule, and said ferrule including a second annular rim extending from said annular end face located radially outwardly of said isolator element and radially inwardly of said first annular rim, said second rim having an end portion disposed generally radially inwardly for joining said isolator element to said ferrule;
e. cathode means comprising iodine-containing material within said casing and in operative contact with said exposed surface portion of said lithium element and with a major portion of the surface of said casing in a manner such that said casing serves as a cathode current collector; and
f. said sealing means shielding said conductor means from said iodine-containing material and electrically insulating said conductor means from said casing;
g. whereby an electrical potential difference exists between said conductor means and said casing during operation of said cell.

26. A cell according to claim 25, wherein said insulator includes a radially outwardly extending annular flange portion defining said insulator end face and wherein said first annular rim of said ferrule engages insulator annular flange to join said insulator to said ferrule.

27. A cell according to claim 26, wherein said ferrule is of metal and said cell further includes a protective ring element between said first annular rime and said insulator annular flange.

28. A cell according to claim 25, further including a seal between said isolator element and said second annular rim of said ferrule.

29. A cell according to claim 25, wherein said ferrule is of metal and said cell further includes a seal ring and a protective ring between said second annular rim of said ferrule and said isolator element.

30. a lithium-iodine cell comprising:
a. a casing of electrically conducting material;

b. anode means positioned within said casing and comprising an element of lithium having an exposed surface portion and another surface portion;

c. electrical conductor means operatively connected to said other surface portion and extending through said casing;

d. means for sealing said conductor means from the remainder of said cell, said sealing means comprising an insulator element in generally concentric relationship with said conductor within said casing, said insulator element being of a material which does not exhibit electronic conduction when exposed to iodine, an isolator element of a material which does not exhibit electronic conduction when exposed to iodine and located between said insulator element and said conductor, and a ferrule element in generally concentric relationship with said conductor, said ferrule having one end within said casing and joined at said one end to said insulator and to said isolator and said ferrule having a portion extending from said casing, said insulator having a first portion generally circumferentially of a portion of said isolator element and a portion of said conductor, a second portion of larger cross-sectional dimension and spaced from said conductor, and an annular flange portion extending radially outwardly from said second portion, said ferrule being joined to said insulator adjacent said annular flange and said second portion of said insulator;

e. cathode means comprising iodine-containing material within said casing and in operative contact with said exposed surface portion of said lithium element and with a major portion of the surface of said casing in a manner such that said casing serves as a cathode current collector; and f. said sealing means shielding said conductor means from said iodine-containing material and electrically insulating said conductor means from said casing;

g. whereby an electrical potential difference exists between said conductor means and said casing during operation of said cell.

31. A cell according to claim 30, further including an annular rim extending from said ferrule and having a portion extending generally radially inwardly for joining said insulator to said ferrule.

32. A cell according to claim 30, wherein said isolator element has a portion within said second portion of said insulator, wherein said ferrule has an annular rim extending therefrom and surrounding said portion of said isolator element, and further including a seal element between said isolator element portion and said ferrule rim.

33. A lithium-iodine cell comprising:

a. a casing of electrically conducting material;

b. anode means positioned within said casing and comprising an element of lithium having an exposed surface portion and another surface portion;

c. electrical conductor means operatively connected to said outer surface portion and extending through said casing;

d. means for sealing said conductor means from the remainder of said cell, said sealing means comprising an insulator element in generally concentric relationship with said conductor within said casing, said insulator element being of a material which does not exhibit electronic conduction when exposed to iodine, an isolator element of a material which does not exhibit electronic conduction when exposed to iodine and located between said insulator element and said conductor, said isolator element being generally cylindrical having a substantially constant inner diameter and first and second outer diameter portions, said conductor extending through along said isolator element and said isolator second portion being of greater diameter than said first portion, said insulator element having a first generally cylindrical portion having an inner diameter substantially equal to the outer diameter of said isolator first portion for receiving said isolator portion in a relatively snug fitting relation and a second generally cylindrical portion having an inner diameter greater than that of said first portion for receiving said isolator second portion, and a ferrule element in generally concentric relationship with said conductor, said ferrule having one end within said casing and joined at said one end to said insulator and to said isolator and said ferrule having a portion extending from said casing, said ferrule having an end portion abutting said insulator element and including an annular rim extending from said end portion inside said insulator second portion and around about the periphery of said isolator second portion and having a portion extending generally radially inwardly for joining said isolator element to said ferrule, said ferrule including another annular rim radially outwardly of said first-named rim and having a portion extending generally radially inwardly for joining said insulator element to said ferrule;

e. cathode means comprising iodine-containing material within said casing and in operative contact with said exposed surface portion of said lithium element and with a major portion of the surface of said casing in a manner such that said casing serves as a cathode current collector; and f. said sealing means shielding said conductor means from said iodine-containing material and electrically insulating said conductor means from said casing;

g. whereby an electrical potential difference exists between said conductor means and said casing during operation of said cell.

* * * * *

UNITED STATES PATENT AND TRADEMARK OFFICE
CERTIFICATE OF CORRECTION

PATENT NO. : 4,210,708

DATED : July 1, 1980

INVENTOR(S) : Ralph T. Mead, Norbert W. Frenz, Jr., Frank W. Rudolph and Wilson Greatbatch It is certified that error appears in the above-identified patent and that said Letters Patent are hereby corrected as shown below:

Column 2, line 1, "comprising" should read - comprises - line 35, "Referring not" should read - Referring now -.

Column 14, claim 27, line 3, "rime" should read - rim -

Signed and Sealed this

Twenty-eighth Day of October 1980

[SEAL]

Attest:

SIDNEY A. DIAMOND

Attesting Officer

Commissioner of Patents and Trademarks